Figure 1:
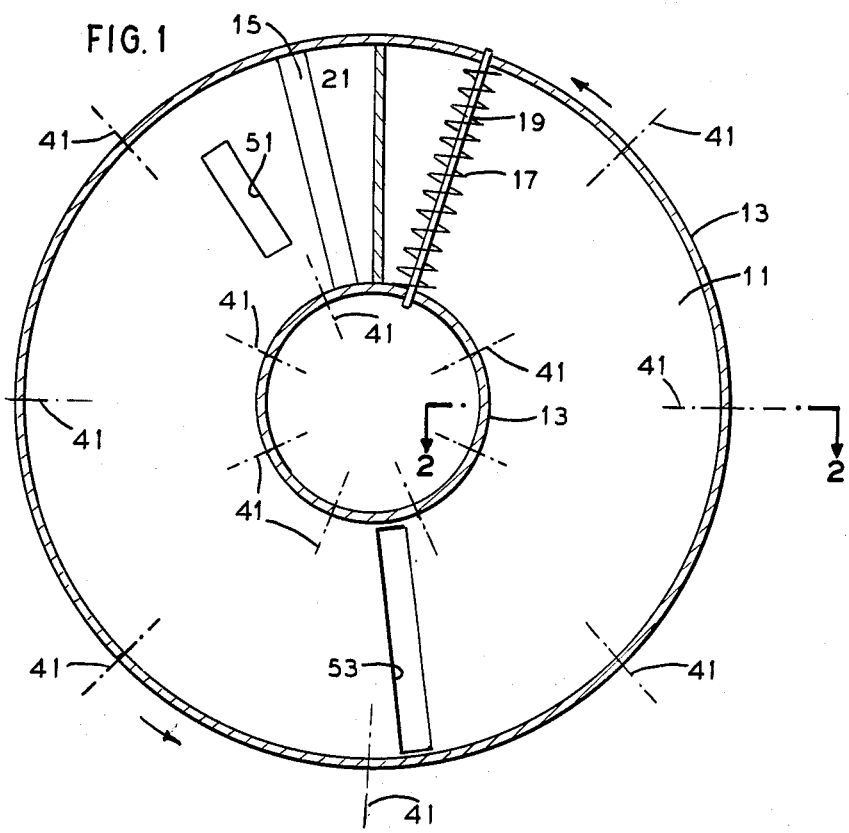

United States Patent [19]

Pargeter

[11] Patent Number: 4,676,741
[45] Date of Patent: Jun. 30, 1987

[54] RADIANTLY HEATED FURNACE

[75] Inventor: John K. Pargeter, Ellwood City, Pa.

[73] Assignee: The International Metals Reclamation Company, Inc., Ellwood City, Pa.

[21] Appl. No.: 921,452

[22] Filed: Oct. 22, 1986

[51] Int. Cl.$^4$ ............................................. F27B 9/16
[52] U.S. Cl. ...................................... 432/142; 75/33; 432/11; 432/239
[58] Field of Search ............... 432/138, 142, 239, 20, 432/11; 75/33, 3; 414/157

[56] References Cited

U.S. PATENT DOCUMENTS

| | | | |
|---|---|---|---|
| 1,157,087 | 10/1915 | Gross | 432/142 |
| 2,089,782 | 8/1937 | Carlsson | 75/33 X |
| 3,443,931 | 5/1969 | Beggs et al. | 75/33 |

Primary Examiner—Edward G. Favors
Attorney, Agent, or Firm—Raymond J. Kenny; Francis J. Mulligan, Jr.; Edward A. Steen

[57] ABSTRACT

A radiantly heated, travelling hearth furnace having a supplementary feed means positioned intermediate the initial loading point and the final take-off point to increase the capacity of the furnace for treating objects fed thereto. When the objects are pellets of iron oxide and carbonaceous reductant the provision of supplementary feed means about half-way along the travel path of the hearth promotes uniformity of product by inhibition of reoxidation of reduced iron by exposure to a fossil-fuel-fired furnace atmosphere.

8 Claims, 2 Drawing Figures

U.S. Patent    Jun. 30, 1987    4,676,741

RADIANTLY HEATED FURNACE

TECHNICAL FIELD

The present invention is concerned with radiantly heated hearth furnaces.

BACKGROUND OF THE INVENTION

In U.S. patent application Ser. No. 707,796, U.S. Pat. No. 4,622,905, there is disclosed an improvement in the operation of a rotary hearth furnace which has an impermeable, horizontally rotating hearth heated from above by energy radiating from flames. The present invention is particularly pertinent to such a rotary hearth furnace in which any particular point on the hearth surface travels in a circular path from a first locus at which items to be heat processed are placed on the hearth to a second locus at which those items now heat processed are removed from the hearth and in which objects being heat processed are at rest relative to the hearth during travel from the first to the second locus. The production capacity of such a hearth furnace is governed by the linear speed of the hearth and the maximum number of layers of objects which can be placed on the hearth assuming radiant energy to be in excess. In the case of the furnace described in U.S. application Ser. No. 707,796 the objects to be heat processed are ball-like masses of metal oxide material in association with a carbonaceous reductant (e.g. $Fe_2O_3$+coke). In this particular instance, the ball-like objects perhaps 2 to 3 cm. in diameter can only be placed upon the hearth approximately three-deep and still achieve adequate heat processing (e.g. reduction of metal oxide) during normal hearth travel. If fourth, fifth etc. layers are loaded on the hearth at the first locus, only the top three layers will be adequately heat processed because all layers under the top three will be in the shadow of the top three layers and will remain relatively cool. While the observation of adequate heat processing of only three layers resting on an impermeable hearth is strictly applicable only to roughly spherical objects, those skilled in the art will appreciate that a similar consideration of shadowing will govern the maximum number of static layers of any particularly shaped objects heat processed by subjecting them to radiant energy.

In order to increase the productive capacity of the hearth as disclosed in U.S. application Ser. No. 707,796 one might consider adding mechanical lifting means to the hearth to periodically displace the upper and lower layers of objects being heat processed or converting the furnace to a permeable hearth structure involving passage of hot gas through the hearth and pellet bed to heat by forced convection-conduction rather than by radiation. Both of these options are very expensive and somewhat unreliable when operating a furnace at temperatures above 1000° C. containing a corrosive atmosphere, e.g. water vapor, CO and $CO_2$. Furthermore, as to the first option, if, during heat processing, the whole or the surface of objects being processed softens, it is likely that adhesion of objects could occur which would obviate the effect of the lifting means.

STATEMENT OF THE INVENTION

It is the objective and the essence of the present invention to provide in the rotary hearth furnace as described in U.S. application Ser. No. 707,796, U.S. Pat. No. 4,622,905, or in any moving hearth furnace having a propelling means, an impermeable hearth and heated by radiation means, a means of feeding additional objects onto the thin layer (e.g. three objects deep) existing on the hearth, said means being positioned intermediate the first feed locus and the second removal locus. From a process or method point of view the present invention is describable as an improvement in a process in which objects are heat processed by exposure in a thin layer to radiant thermal energy while supported on an impermeable travelling surface. The processing is carried out over a path extending from an entry locus at which cool objects are placed in a thin layer on said travelling surface to a removal locus at which heat processed objects are removed from said impermeable travelling surface. The improvement comprises adding additional numbers of said cool objects to said thin layer on said travelling surface at at least one point intermediate said entry locus and said removal locus to thereby increase the capacity of said travelling surface for heat processing said objects. In the case of reduction of metal oxides by carbon in the absence of any significant amount of liquid phase the improvement of the present invention also minimizes reoxidation of reduced oxide.

The present invention is particularly applicable to solid state metallization of pelletized feed containing reducible metal oxide (e.g. iron oxide, nickel oxide, cobalt oxide and mixtures of such oxides) and reductant (e.g. coal, coke, residual oil, paper mill waste, etc.) where, in a first stage of travel on a moving hearth, the pellets exposed to thermal radiation in a layer three deep can be rapidly heated to reacting temperature e.g. 1000° C. inducing rapid initial reduction reaction and then require only moderate energy input in order to provide the heat necessary for completion of the endothermic reduction reaction. Particularly in such a case, a fourth, fifth and perhaps a sixth layer of pellets placed atop the initially placed pellets at a point perhaps between 40% and 60% along the path of hearth travel will be heated not only by radiant energy from above but also, to a limited extent, by product of reduction gases (e.g. CO, $CO_2$, $H_2O$) flowing from below. At the point of pellet removal from the hearth, metallization of all pellets will be substantially complete and reoxidation of pellets minimized.

DRAWING

FIG. 1 of the drawing depicts a plan view of a rotary hearth in accordance with the present invention.

Figure 2:
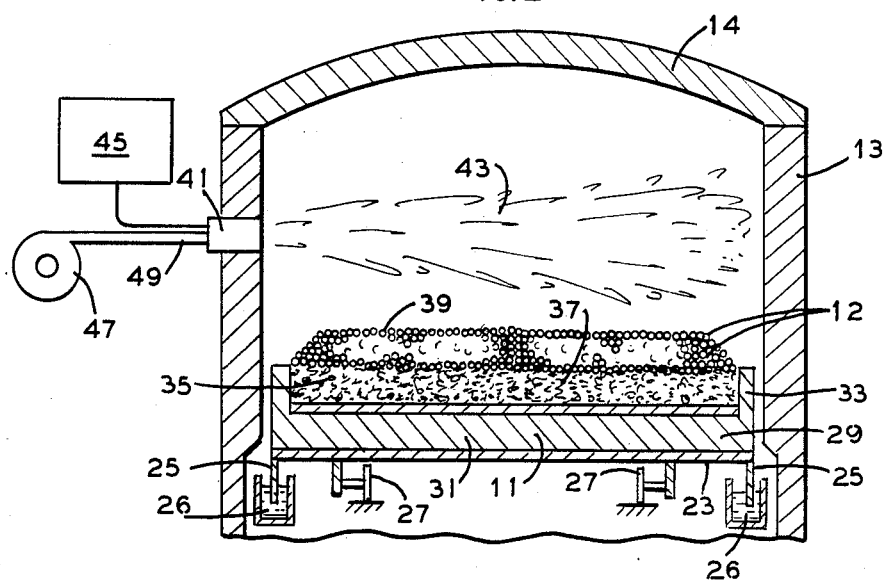

FIG. 2 shows a cross-section of the furnace of FIG. 1.

PREFERRED ASPECT OF INVENTION

The preferred aspect of the invention is depicted in the figures of the drawing. Referring now thereto, hearth 11 rotates horizontally in enclosure 13 bearing on its upper surface a layer, about 3 deep of pellets 12. Enclosure 13 is toroidal in configuration and is covered by roof 14. At point 15 of the circular path of hearth 11, pellets 12 combining metal oxide and reductant are loaded approximately 3 deep on hearth 11 through roof 14. The pellets travel on hearth 11 to point 17 at which they are removed by water-cooled screw 19. Fixed barrier 21 separates points 17 and 15. Hearth 11 having a surface of granular refractory 37 rests on metal support plate 23 from which skirts 25 descend to run in water filled troughs 26. Hearth 11 rides on wheels 27 and comprises a refractory trough 29 with bottom mass 31 and side walls 33. Superimposed upon bottom mass 31 is insulating layer 35 upon which in turn is superimposed granular refractory layer 37, the top of which comprises hearth top 39. Hearth 11 is heated by burners 41 which, preferably, burn powdered coal from source 45 in air provided by blower 47 through line 49. Gas from flames 43 flow clockwise, countercurrent to the travel of hearth 11 around its toroidal axis and exits through flue 51. In accordance with the present invention additional pellets 12 are introduced onto the pellet layer on hearth 11 at about point 53 through roof 14 in any convenient manner which minimizes gas flow through roof pellet port. In travel from point 53 to point 17 the additional pellets as well as initially placed pellets are substantially fully metallized by oxide-reductant reaction.

Those skilled in the art will recognize that the specific details of the present invention can be modified. Specifically hearth 11 can be radiantly heated in any convenient manner by any available fuel including radiant electric heaters. The specific construction of hearth 11 forms no part of this invention. Thus while hearth 11 has been depicted as a single unit, toroidal hearth, it can be a series of car units arranged to travel in any convenient path e.g. a circle or a straight line.

In operating a rotary hearth furnace to cause reaction in a pelletized feed comprising iron oxide and a carbonaceous reductant, the addition of a second layer of feed roughly midway along the route of travel between initial pellet feed and pellet take-off does more than increase the pellet capacity of the hearth. Because the furnace atmosphere produced by burning fossil fuels is oxidizing to iron and carbon, the metallization of a single bed of pellets at the end of hearth travel is not uniform. At the start of travel on the hearth, a pellet is of uniform composition, i.e., a fixed ratio of iron oxide to carbon with sufficient carbon present to be in slight excess over that stoichiometrically necessary to produce metallic iron. When exposed to heat radiating downwardly from above, the top of the pellet (or the topmost pellet of a layer of two or three pellet thickness) reacts more rapidly than the bottom of the pellet. At some point in pellet travel, the top of the pellet is essentially all iron with very little, if any carbon present. The bottom of the pellet contains iron and significant amounts of carbon and iron oxide. As this pellet travels further, the bottom of the pellet increases in metalization but the top of the pellet starts to oxidize by reaction of iron with the furnace atmosphere. The net result of using a single pellet deposition and take-off in a fossil-fueled furnace is a variation in pellet character from iron, containing essentially carbon-free reoxidized metal, to iron, containing carbon and unreacted iron oxide.

When a second layer of pellets is added roughly midway in the travel of the first layer of pellets, the composition of the total bed at the take-off point is more uniform. As a first point, the uppermost portion of the first layer is protected from oxidation by the upper second layer and the carbon monoxide given off during reduction of the iron oxide in the second layer. The bottom portion of the first layer continues reaction under the second layer much as it would in the absence of a second layer. The top portion of the second layer reacts rapidly to achieve high metallization because it is exposed to the hottest part of the furnace and the furnace atmosphere. The bottom portion of the second layer reacts somewhat more rapidly than the bottom portion of the first layer bacuase it is heated not only by radiation but also by thermal conduction and gasses evolving from the first layer. The time of travel of the second layer is sufficiently short so that little or no reoxidation of iron reduced from the oxide takes place, there being at time of take-off sufficient carbon in the exposed areas of the upper portion of the second layer to prevent such reoxidation. Thus, the net result of the use of a second layer of pellets in the furnace of the present invention is to produce a higher grade product essentially devoid of reoxidized metal and more uniform in carbon and metallic iron content.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A travelling hearth furnace comprising at least one impermeable hearth member adapted to travel generally horizontally along a path from a first locus to a second locus, means to cause said hearth member to travel along said path, means along said path to direct radiant heat toward the upper surface of said hearth member, means at said first locus to position a thin layer of objects on said upper surface of said hearth member, means at said second locus to remove objects from said hearth member and means, positioned intermediate said first locus and said second locus, to position additional objects on said thin layer of objects on said upper surface of said hearth member.

2. A travelling hearth furnace as in claim 1 wherein said hearth member is a toroidally shaped member adapted to rotate around its toroidal axis.

3. A travelling hearth furnace as in claim 2 wherein said means to direct radiant heat toward the upper surface of said hearth member are a plurality of burners spaced along the path of rotation of said toroidally shaped member.

4. A travelling hearth furnace as in claim 3 wherein said burners are burners adapted to employ powdered coal as fuel.

5. A travelling hearth furnace as in claim 1 wherein said means positioned intermediate said first locus and said second locus is positioned at a site about 40 to 60% of the distance between said first locus and said second locus.

6. In a process in which objects are heat processed by exposure in a thin layer to radiant thermal energy while supported on an impermeable travelling surface, said processing being carried out over a path extending from an entry locus at which cool objects are placed in a thin layer on said travelling surface to a removal locus at which heat processed objects are removed from said impermeable travelling surface, the improvement comprising adding additional numbers of said cool objects to said thin layer on said travelling surface at a point intermediate said entry locus and said removal locus to thereby increase the capacity of said travelling surface for heat processing said objects.

7. A process as in claim 6 wherein said cool objects are pellets containing a reducible metal oxide and a solid, carbonaceous reductant and said radiant thermal energy is derived from a furnace atmosphere resulting from the combustion of fossil fuel.

8. A process as in claim 7 wherein said reducible metal oxide is iron oxide and wherein the provision of said additional numbers of said pellets is carried out at a site positioned about 40 to 60% of the distance between said first locus and said second locus whereby said additional numbers of said pellets inhibit reoxidation of iron metal in said initially placed pellets and promote product uniformity.

* * * * *